US006764766B2

(12) United States Patent
Kitaike et al.

(10) Patent No.: US 6,764,766 B2
(45) Date of Patent: Jul. 20, 2004

(54) ACRYLIC RESIN FILM, METHOD OF PRODUCING THE SAME, AND LAMINATE USING THE SAME

(75) Inventors: Yukio Kitaike, Hiroshima (JP); Hideyuki Fujii, Hiroshima (JP); Kazuhiko Nakagawa, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 110 days.

(21) Appl. No.: 10/096,664

(22) Filed: Mar. 14, 2002

(65) Prior Publication Data

US 2003/0032722 A1 Feb. 13, 2003

(30) Foreign Application Priority Data

Mar. 15, 2001 (JP) ........................................ 2001-073996

(51) Int. Cl.[7] .............................................. B32B 27/30
(52) U.S. Cl. .................. 428/402.22; 428/212; 428/202; 428/520; 428/522; 525/8; 525/10; 525/59; 264/175
(58) Field of Search .............................. 264/175; 525/8, 525/59, 10; 428/212, 220, 402.22, 323, 520, 522

(56) References Cited

U.S. PATENT DOCUMENTS

| 5,166,003 A | | 11/1992 | Makinae et al. |
| 5,225,496 A | | 7/1993 | Yamamoto et al. |
| 5,264,164 A | * | 11/1993 | Pickett et al. ............... 264/40.6 |
| 2003/0032722 A1 | * | 2/2003 | Kitaike et al. .................. 525/8 |

FOREIGN PATENT DOCUMENTS

| EP | 0 627 469 | 12/1994 |
| EP | 0 763 560 | 3/1997 |
| EP | 0 897 954 | 2/1999 |
| EP | 1 000 978 | 5/2000 |
| EP | 1 022 311 | 7/2000 |
| WO | WO 01/62843 | 8/2001 |

OTHER PUBLICATIONS

Chemical Abstracts, AN 1997–545530 [50], XP–002207670, JP 9–263614, Oct. 7, 1997.
Chemical Abstracts, AN 1998–537619 [46], XP–002207671, JP 10–237261, Sep. 8, 1998.
Chemical Abstracts, AN 2000–233078 [20], XP–002207672, JP 2000–053841, Feb. 22, 2000.
Chemical Abstracts, AN 2000–266686 [23], XP–002207673, JP 2000–072895, Mar. 7, 2000.
Chemical Abstracts, AN 2000–266685 [23], XP–002207674, JP 2000–072894, Mar. 7, 2000.
Chemical Abstracts, AN 2001–151627 [16], XP–002207675, JP 2000–327874, Nov. 28, 2000.
Chemical Abstracts, AN 1993–200606 [25], XP–002207676, JP 5–125221, May 21, 1993.
Chemical Abstracts, AN 1994–022997 [03], XP–002207677, JP 3–123218, Jan. 9, 2001.
Chemical Abstracts, AN 1994–124142 [15], XP–002207678, JP 6–073200, Mar. 15, 1994.

* cited by examiner

Primary Examiner—D. Lawrence Tarazano
(74) Attorney, Agent, or Firm—Oblon, Spivak, McClelland, Maier & Neustadt, P.C.

(57) ABSTRACT

There is provided an acrylic resin film having good matted appearances and good printing characteristics, e.g., little suffering missing prints when printed.

There is provided an acrylic resin film having a differential 60° surface gloss of 5% or more between the front and back sides, and thickness of 300 $\mu$m or less; a method of producing the above-described acrylic resin film, where a molten acrylic resin composition is extruded, and then rolled between a mirror-ground roll and rubber or embossed roll into the film; and a laminate (formed article coated with the acrylic resin film) with a side having a higher 60° surface gloss coming into contact with a base.

18 Claims, No Drawings

ACRYLIC RESIN FILM, METHOD OF PRODUCING THE SAME, AND LAMINATE USING THE SAME

BACKGROUND OF THE INVENTION

1. Field of the Invention

This present invention relates to an acrylic resin film useful for, e.g., surface decoration of a base material and having good matted outer appearances and printing characteristics, a method of producing the same, and a laminate coated with the film on the surface.

2. Description of the Related Art

One of the surface decorating methods which draw a design on a formed article at low cost is in-mold forming. It provides a printed pattern on a sheet or film of, e.g., polyester, polycarbonate or acrylic resin, and injects a resin for the base onto the sheet or film placed in the injection mold, where the sheet or the film may be formed into a desired shape by vacuum forming or the like before being placed in the mold. This in-mold forming method can combine the sheet or film with the base into the monolithic structure at high productivity, or transfer only the printed section.

Japanese Patent Laid-Open No. 9-263614 discloses an acrylic resin film suitably processed by the above-described in-mold forming method and having excellent printing characteristics. More specifically, it describes that the acrylic resin film with excellent printing characteristics, 80 $\mu$m or more in diameter, one/m$^2$ or less in foreign matter concentration and 300 $\mu$m or less in thickness, can be produced from the acrylic resin composition containing given quantities of a thermoplastic polymer and rubber, the thermoplastic polymer being produced by polymerizing a given monomer mixture by a given method, and that the acrylic resin film, when printed, can realize excellent printing characteristics, controlling missing prints resulting from fisheyes.

Recently, the printed acrylic resin film surface is required to be matted, and provided with a design or decoration for feeling of high quality, deepness or the like. Such requirements can be satisfied by printing a matted acrylic resin film.

Japanese Patent Laid-Open No. 10-237261 discloses that a matted acrylic resin film wherein the surface gloss is not easy to change can be produced from the acrylic resin composition, described in Japanese Patent Laid-Open No. 9-263614, by incorporating therein a rubber-containing polymer with particle size controlled within a specific range and matting agent, e.g., inorganic powder, organic, crosslinked powder or straight-chain polymer having hydroxyl group.

SUMMARY OF THE INVENTION

Japanese Patent Laid-Open No. 10-237261 does not describe missing print in detail, which may occur when a matted acrylic resin film is printed. The inventors of the present invention have printed the matted acrylic resin film prepared in accordance with the method described in the specification to find more than 10 missing prints per unit area (1 m$^2$) of the printed surface. Therefore, it has still room for improvement in printing characteristics, although excellent in matting characteristics.

In general, the missing prints, when massively occur on the printed acrylic resin film, deteriorate its decorations and outer appearances, and also yield.

It is an object of the present invention to provide an acrylic resin film having excellent matted outer appearances and good printing characteristics, e.g., little suffering missing prints when printed. It is another object of the present invention to provide a method of producing the above acrylic resin film. It is still another object of the present invention to provide a laminate coated with the above film.

The inventors of the present invention have found, after having extensively studied to solve the above problems, that the acrylic resin film exhibits very good effects, when its surface gloss on the front side is different from that on the back side, and the difference in gloss is in a specific range, reaching the present invention.

The present invention provides the acrylic resin film having a differential 60° surface gloss of 5% or more between the front and back sides, and thickness of 300 $\mu$m or less.

The present invention also provides a method of producing the above-described acrylic resin film, where a molten acrylic resin composition is extruded, and then rolled between a mirror-ground roll and rubber or embossed roll into the film.

The present invention also provides a laminate of an acrylic resin film, with the film side having a higher 60° surface gloss coming into contact with the base.

DETAILED DESCRIPTION OF THE PREFERRED EMBODIMENTS

The resin for the acrylic resin film of the present invention maybe selected from various known acrylic resins. It is however preferable to use (A) acrylic resin composition, (B) acrylic resin composition containing a polymer of multi-layered structure, or (C) acrylic resin composition incorporated with a matting agent, described below. These acrylic resin compositions (A) to (C) have a thermal deformation temperature of 60 to 115° C.

First, the acrylic resin composition (A) is described. The acrylic resin composition (A) is composed of 5.5 to 99.9% by mass of the rubber-containing polymer (A-1) and 0.1 to 94.5% by mass of the thermoplastic polymer (A-2) produced with an alkyl methacrylate ester as the major component, where the components (A-1) and (A-2) total 100% by mass.

The rubber-containing polymer (A-1) for the acrylic resin composition (A) is of multi-layered structure with two or more layers, composed of a hard polymer (a-2) as an outer layer having a structure of one or more layers, produced by graft polymerization of monomers with an alkyl methacrylate ester as the major component, in the presence of an elastic copolymer (a-1) as an inner layer having a structure of one or more layers, produced with an alkyl acrylate ester as the major component.

The alkyl acrylate ester for the elastic copolymer (a-1) may be selected from various known alkyl acrylate esters, particularly preferably butyl acrylate and 2-ethylhexyl acrylate. The alkyl acrylate ester is used as the major component for the monomers which constitute the elastic copolymer (a-1). More specifically, the alkyl acrylate ester preferably accounts for 35 to 99.9% by mass of the total monomers. It improves film formability, when accounts for 35% by mass or more, preferably 50% by mass or more. Its content in the above range means the content of the alkyl acrylate ester as the whole elastic copolymer (a-1), when the elastic copolymer (a-1) has a structure comprising 2 layers or more. For example, when the elastic copolymer (a-1) has a structure with a hard core, the content of the alkyl acrylate ester in the first layer (core section) may be lower than 35% by mass.

Another vinyl monomer copolymerizable with the alkyl acrylate ester may be used as the monomer for the elastic copolymer (a-1), in addition to the alkyl acrylate ester. Such a vinyl monomer preferably accounts for 64.9% by mass or less in the total monomers. Other vinyl monomers preferably used for the present invention include alkyl methacrylate esters, e.g., methyl methacrylate, butyl methacrylate and cyclohexyl methacrylate; and styrene and acrylonitrile. They may be used either individually or in combination.

It is preferable to use a crosslinkable monomer as one of the monomers for the elastic copolymer (a-1) The crosslinkable monomers useful for the present invention include ethylene glycol dimethacrylate, butane diol dimethacrylate, allyl acrylate, allyl methacrylate, diallyl phthalate, triallyl cyanurate, triallyl isocyanurate, divinyl benzene, diallyl maleate, trimethylol propane triacrylate and allyl cinnamate. They may be used either individually or in combination. The crosslinkable monomer is preferably used to constitute 0.1 to 10% by mass of the total monomers.

The rubber-containing polymer (A-1) is of multi-layered structure with two or more layers, composed of the hard polymer (a-2) produced by graft polymerization of the monomers with an alkyl methacrylate ester as the major component, in the presence of the elastic copolymer (a-1) described above. More specifically, the elastic copolymer (a-1) constitutes the inner layer and the hard polymer (a-2) the outer layer.

For the graft polymerization to produce the hard polymer (a-2), an alkyl methacrylate ester is used as the major component. More specifically, the alkyl methacrylate ester accounts for at least 50% by mass of the total monomers for the graft polymerization. The alkyl methacrylate esters useful for the present invention include methylmethacrylate, ethyl methacrylate, butyl methacrylate, 2-ethylhexyl methacrylate and cyclohexyl methacrylate.

Another vinyl monomer copolymerizable with the alkyl methacrylate ester may be used as the monomer for the graft polymerization to produce the hard polymer (a-2), together with the alkyl methacrylate ester. Such a vinyl monomer preferably accounts for 50% by mass or less in the total monomers. These vinyl monomers preferably used for the present invention include alkyl acrylate esters, e.g., methyl acrylate, butyl acrylate and cyclohexyl acrylate; and styrene and acrylonitrile. They may be used either individually or in combination.

These monomers are graft-polymerized in one or more stages in the presence of the elastic copolymer (a-1), to produce the hard polymer (a-2) as the outer layer, and hence the rubber-containing polymer (A-1). The hard polymer (a-2) is incorporated in the rubber-containing polymer (A-1) at 10 to 400 parts by mass per 100 parts by mass of the elastic copolymer (a-1), more preferably 20 to 200 parts by mass.

The rubber-containing polymer (A-1) preferably has a particle size of 0.01 to 0.5 $\mu$m, more preferably 0.08 to 0.3 $\mu$m. In particular, it is preferably 0.08 $\mu$m or more for film-making properties of the polymer.

For the method of producing the rubber-containing polymer (A-1), i.e., the polymerization method to produce the elastic copolymer (a-1) and that to produce the hard polymer (a-2), emulsion polymerization as one of the known methods may be adopted. In general, the polymerization temperature is preferably 40° C. or higher, more preferably 60° C. or higher, and preferably 95° C. or lower and more preferably 120° C. or lower, although the optimum polymerization temperature varies depending on the type and quantity of the polymerization initiator used.

The polymerization initiator for the present invention may be selected from the various known ones. It may be incorporated in the aqueous and/or monomer phase.

The emulsifier for the emulsion polymerization may be anionic, cationic or nonionic, of which an anionic surfactant is particularly preferable. The anionic surfactants useful for the present invention include carboxylate-based surfactants, e.g., potassium oleate, sodium stearate, sodium myristate and sodium N-lauroylsarcosine and dipotassium alkenyl succinate; sulfate ester-based ones, e.g., sodium lauryl sulfate; sulfonate-based ones, e.g., sodium dioctyl sulfosuccinate, sodium dodecylbenzene sulfonate and sodium alkyl diphenyl ether disulfonate; phosphate ester-based ones, e.g., sodium polyoxyethylene alkyl phenyl ether phosphate.

The polymer latex produced by the emulsion polymerization may be filtered by, e.g., a filter having a mesh of 100 $\mu$m or less, and solidified by a known method, e.g., acid solidification, salt solidification, freeze solidification or spray drying. The acid solidification method may use an inorganic acid, e.g., sulfuric, hydrochloric or phosphoric acid; or inorganic acid, e.g., acetic acid. The salt solidification method may use an inorganic salt, e.g., sodium sulfate, magnesium sulfate, aluminum sulfate or calcium chloride; or inorganic salt, e.g., calcium acetate or magnesium acetate. The solidified polymer is further treated by, e.g., washing, dehydration or drying, to produce the rubber-containing polymer (A-1).

The thermoplastic polymer (A-2) for the acrylic resin composition (A) is a polymer with an alkyl methacrylate ester as the major component, and maybe selected from various known ones.

The thermoplastic polymer (A-2) is produced by polymerizing 50 to 99.9 parts of an alkyl methacrylate ester having an alkyl group of 1 to 4 carbons, 0.1 to 50 parts of an alkyl acrylate ester and 0 to 49.9 parts of another vinyl monomer copolymerizable with them, all parts by mass, where these components account for 100 parts. It preferably has a reduced viscosity (measured at 25° C. for 0.1 g of the polymer dissolved in 100 mL of chloroform) of 0.1 L/g or less for its film-making properties.

The alkyl methacrylate esters for producing the thermoplastic polymer (A-2) include methyl methacrylate, ethyl methacrylate and butyl methacrylate, of which methyl methacrylate is more preferable than the others.

Another vinyl monomer copolymerizable with the alkyl methacrylate ester may be used as the monomer for producing the thermoplastic copolymer (A-2), together with the alkyl methacrylate ester. Such a vinyl monomer is preferably an alkyl acrylate ester, as used for the preferable polymer described earlier. More specifically, the preferable alkyl acrylate esters include methyl acrylate, ethyl acrylate and butyl acrylate. The alkyl acrylate ester is preferably used at 0.1 to 50 parts by mass. The vinyl monomer, other than the alkyl acrylate ester, may be used as the other copolymerizable monomer. It is preferably used at 49.9 parts by mass or less. These vinyl monomers include aromatic vinyl compounds, e.g., styrene; cyanided vinyl-based monomers, e.g. acrylonitrile; unsaturated dicarboxylates anhydride, e.g., maleic and itaconic anhydride; and N-phenyl maleimide and N-cyclohexyl maleimide.

The method of producing the thermoplastic polymer (A-2) is not limited. It may be produced by, e.g., suspension, emulsion or block polymerization. A chain transfer agent or another polymerization aid may be used for the polymerization process. The chain transfer agent may be selected from various ones. The particularly preferable one is a mercaptan.

The thermoplastic polymer (A-2) preferably has a reduced viscosity of 0.1 L/g or less for its film-making properties, because starting resin for the film is adequately elongated when molten. It also preferably has a reduced viscosity of 0.05 L/g or more for preventing it from becoming fragile, and hence preventing broken film while it is being produced or printed.

Next, the acrylic resin composition (B) is described. The acrylic resin composition (B) has the basic structure composed of the polymer (B-a) for the innermost layer, crosslinked elastic polymer (B-b) and polymer (B-c) for the outermost layer, described below. It also has at least one intermediate layer (B-d), described below, between the layer of the crosslinked elastic polymer (B-b) and the outermost layer of the polymer (B-c). It is the resin composition of multi-layered polymer structure, whose alkyl acrylate ester content simply decreases as it goes the layer of the crosslinked elastic polymer (B-b), the polymer (B-d) for the intermediate layer and the polymer (B-c) for the outermost layer, in this order.

The polymer (B-a) for the innermost layer in the acrylic resin composition (B) is produced by polymerizing a monomer composition of 80 to 100 parts of an alkyl acrylate ester having an alkyl group of 1 to 8 carbon atoms or alkyl methacrylate ester having an alkyl group of 1 to 4 carbon atoms (B-a1), 0 to 20 parts of another vinyl monomer (B-a2) having a copolymerizable double bond, and 0 to 10 parts of a multifunctional monomer (B-a3), all parts by mass, where these components account for 100 parts. This monomer composition is further incorporated with 0.1 to 5 parts by mass of a graft crossing agent for the polymerization.

Of the alkyl (meth) acrylate esters (B-a1) for the polymer for the innermost layer (B-a), those alkyl acrylate esters having an alkyl group of 1 to 8 carbon atoms include methyl acrylate, ethyl acrylate, propyl acrylate, butyl acrylate, 2-ethylhexyl acrylate and n-octyl acrylate, of which the alkyl acrylate ester having a low Tg is particularly preferable. They may be used either individually or in combination.

Of the alkyl (meth) acrylate esters (B-a1) for the polymer for the innermost layer (B-a), those alkyl methacrylate esters having an alkyl group of 1 to 4 carbon atoms include methyl methacrylate, ethyl methacrylate, propyl methacrylate and butyl methacrylate. They may be used either individually or in combination.

The alkyl (meth) acrylate ester (B-a1) is most preferably used consistently in the various subsequent steps. However, a mixture of two or more ester monomers or another alkyl (meth)acrylate ester may be used, depending on purposes of the final product.

The preferable examples of the other monomers (B-a2) having a copolymerizable double bond include acrylic monomers, e.g., higher alkyl acrylate ester, lower alkoxy acrylate ester, cyanoethyl acrylate ester, acrylamide, acrylic acid and methacrylic acid. The other compounds useful for the present invention include styrene, alkyl-substituted styrene, acrylonitrile and methacrylonitrile.

The preferable multifunctional monomers (B-a3) include alkylene glycol dimethacrylate esters, e.g., ethylene glycol dimethacrylate, 1,3-butylene glycol dimethacrylate, 1,4-butylene glycol dimethacrylate and propylene glycol dimethacrylate. The other compounds useful for the present invention include polyvinyl benzene, e.g., divinyl benzene and trivinyl benzene; and alkylene glycol diacrylate ester. The above monomer generally works effectively for crosslinking in the layer in which it is incorporated, but little functions to bind the layer to the interlayer with another layer. The fairly stable multi-layered structure may be obtained even in the complete absence of the multifunctional monomer (B-a3), so long as a graft crossing agent is present. For example, when strength at high temperature is strongly required, it is recommended to use the multifunctional monomer (B-a3) for specific purposes, as required.

The graft crossing agents useful for the present invention include allyl, methallyl and crotyl esters of copolymerizable α, β-unsaturated carboxylic and dicarboxylic acids, of which allyl esters of acrylic, methacrylic, maleic and fumaric acids are more preferable, in particular allyl methacrylate exhibiting an excellent effect. Triallyl cyanurate and triallyl isocyanurate are also useful. The above graft crossing agent chemically bonds mainly by the conjugated unsaturated bond in its ester, which reacts much faster than the allyl, methallyl or crotyl group. A substantially significant portion of the allyl, methallyl or crotyl group reacting more slowly works effectively in the polymer for the next layer, giving the graft bond in the interface between the adjacent layers.

Content of the graft crossing agent is very important, and it is incorporated at 0.1 to 5 parts by mass per 100 parts by mass of the components (B-a1) to (B-a3) totaled. The effective quantity of the graft bond increases, when it is incorporated at 0.1% by mass or more. Moreover, its reaction with the crosslinked elastic polymer (B-b), which is formed by polymerization in the second stage, is adequately controlled when it is incorporated at 5 parts by mass or less, to prevent decrease of elasticity of the 2-layered crosslinked rubber elastomer of two-layered elastic structure. It is preferably incorporated at 0.5 to 2 parts by mass.

The acrylic resin composition (B) preferably contains the polymer (B-a) for the innermost layer at 5 to 35% by mass, more preferably 5 to 15%. Moreover, its content is preferably lower than that of the crosslinked polymer (B-b).

The crosslinked polymer (B-b) for the acrylic resin composition (B) is an important component for imparting rubber elasticity to the polymer of multi-layered structure, and is produced by polymerizing a monomer composition of 80 to 100 parts of an alkyl acrylate ester (B-b1) having an alkyl group of 1 to 8 carbon atoms, 0 to 20 parts of another vinyl monomer (B-b2) having a copolymerizable double bond, and 0 to 10 parts of a multifunctional monomer (B-b3), all parts by mass, where these components account for 100 parts. Moreover, 100 parts by mass of the above monomer composition is incorporated with 0.1 to 5 parts by mass of a graft crossing agent for the polymerization.

The concrete examples of the components (B-b1) to (B-b3) and graft crossing agent for the crosslinked elastic polymer (B-b) are similar to those of the components (B-a1) to (B-a3) and graft crossing agent for the polymer (B-a) for the innermost layer, described earlier.

The acrylic resin composition (B) is preferably incorporated with the crosslinked elastic polymer (B-b) at 10 to 45% by mass. Its content is preferably higher than that of the polymer (B-a) for the innermost layer.

The polymer (B-c) for the outermost layer in the acrylic resin composition (B) is an effective component for distributing the film-making and formability properties, and is produced by polymerizing a monomer composition of 51 to 100 parts of an alkyl methacrylate ester (B-c1) of 1 to 4 carbon atoms and 0 to 49 parts of another vinyl monomer (B-c2) having a copolymerizable double bond, all parts by mass. It has a glass transition temperature of 60° C. or higher.

The concrete examples of the component (B-c1) and other monomer (B-c2) for the polymer (B-c) for the outermost layer are similar to those of the alkyl methacrylate ester (B-a1) and other monomer (B-a2) for the polymer (B-a) for the innermost layer, described earlier.

The acrylic resin composition (B) is preferably incorporated with the polymer (B-c) for the outermost layer at 10 to 80% by mass.

The polymer (B-d) for the intermediate layer in the acrylic resin composition (B) is produced by polymerizing a monomer composition of 10 to 90 parts of an alkyl acrylate ester having an alkyl group of 1 to 8 carbon atoms, 90 to 10 parts of an alkyl methacrylate ester (B-d2) having an alkyl group of 1 to 4 carbon atoms, 0 to 20 parts of a monomer (B-d3) having a copolymerizable double bond, and 0 to 10 parts of a multifunctional monomer (B-d4), all parts by mass, where these components account for 100 parts. This monomer composition is further incorporated with 0.1 to 5 parts by mass of a graft crossing agent for the polymerization. In this polymer composition (B), the alkyl acrylate ester content simply decreases as it goes from the crosslinked elastic polymer (B-b) towards the outermost layer of the polymer (B-c).

The components (B-d1) to (B-d4) and graft crossing agent for the polymer (B-d) for the intermediate layer are similar to the components (B-a1) to (B-a3) and graft crossing agent for the polymer (B-a) for the outermost layer. The content (monomer composition ratio) of the alkyl acrylate ester in the polymer (B-d) for the intermediate layer is set at a level lower than that of the ester in the crosslinked polymer (B-b) and higher than that of the ester in the polymer (B-c) for the outermost layer.

The acrylic resin composition (B) is preferably incorporated with the polymer (B-d) for the intermediate layer at 5 to 35% by mass. The intermediate layer can effectively exhibit its functions when the content is 5% by mass or more. The final polymer is well-balanced, when the content is 35% by mass or less.

The acrylic resin composition (B) is mainly composed of the multi-layered polymer structure of the polymer (B-a) for the innermost layer, crosslinked elastic polymer (B-b), polymer (B-d) for the intermediate layer, and polymer (B-c) for the outermost layer. The multi-layered resin composition may be produced by the polymerization steps for producing the 4 types of the polymers (B-a) to (B-c), which are effected consecutively in the same reaction system. It should be noted that the products, e.g., particles of a homopolymer and polymers of 2- to 3-layered structures, tend to be formed in addition to the above the multi-layered polymer composed of 4 types of polymers (B-a) to (B-c). The acrylic resin composition (B) of the present invention includes that containing the polymer products other than the polymer composition of multi-layered structure composed of the 4 types of polymers (B-a) to (B-d).

The method of producing the acrylic resin composition (B) most preferably comprises the multi-stage emulsion polymerization steps to be effected consecutively, although not limited thereto. For example, it may be produced by the emulsion/suspension polymerization, where the emulsion step is switched to the suspension step for producing the polymer (B-c) for the outermost layer.

The polymer latex produced by the emulsion polymerization may be filtered by, e.g., a filter having a mesh of 100 μm or less, and solidified by a known method, e.g., acid solidification, salt solidification, freeze solidification or spray drying. The acid solidification method may use an inorganic acid, e.g., sulfuric, hydrochloric or phosphoric acid; or inorganic acid, e.g., acetic acid. The salt solidification method may use an inorganic salt, e.g., sodium sulfate, magnesium sulfate, aluminum sulfate or calcium chloride; or inorganic salt, e.g., calcium acetate or magnesium acetate. The solidified polymer is further treated by, e.g., washing, dehydration or drying.

Next, the acrylic resin composition (C) is described. The acrylic resin composition (C) is composed of 100 parts by mass of the acrylic resin composition (A) or (B) and 0.1 to 40 parts by mass of a matting agent. Use of a matting agent controls a surface gloss of the acrylic resin film under heating during the secondary forming process.

A matting agent for the acrylic resin composition (C) is selected from various known matting agents, organic or inorganic. It is however particularly preferable to use the polymer (D) or (E) containing hydroxyl group, described below, as the matting agent viewed from the matting, film-making and formability properties.

The polymer (D) containing hydroxyl group is produced by polymerization of a monomer composition of 1 to 80 parts of a hydroxyalkyl acrylate ester or hydroxyalkyl methaacrylate ester having an alkyl group of 1 to 8 carbon atoms, 10 to 99 parts of an alkyl methacrylate ester having an alkyl group of 1 to 13 carbon atoms, and 0 to 79 parts of an alkyl acrylate ester having an alkyl group of 1 to 8 carbon atoms, all parts by mass, where these components account for 100 parts.

The hydroxyalkyl (meth)acrylate esters having an alkyl group of 1 to 8 carbon atoms for the polymer (D) containing hydroxyl group include 2-hydroxyethyl methacrylate, 2-hydroxypropyl methacrylate, 2,3-dihydroxypropyl methacrylate, 2-hydroxyethyl acrylate and 4-hydroxybutyl acrylate, of which 2-hydroxyethyl methacrylate is more preferable. The hydroxyalkyl (meth)acrylate ester is incorporated at 1 to 80 parts by mass. It can sufficiently exhibit the matting affect, when present at 1 part by mass or more, and keep the particles well dispersed and impart good film-making properties when present at 80 parts by mass or less. It is incorporated preferably at 5 to 50 parts by mass, more preferably 20 to 50 parts, viewed from the matting and film-making properties.

Vehicle internal parts are generally required to be resistant to chemicals, because they may be stained with an aromatic or hairdressing. For the film to exhibit resistance to the chemicals, the hydroxyalkyl (meth)acrylate ester is incorporated preferably at 5 to 25 parts by mass, more preferably 10 to 20 parts by mass for simultaneously securing the matting properties and resistance to chemicals.

The suitable hydroxyalkyl methacrylate esters having an alkyl group of 1 to 13 carbon atoms for the polymer (D) containing hydroxyl group include lower alkyl methacrylate esters, e.g., methyl methacrylate, ethyl methacrylate and butyl methacrylate, of which methylmethacrylate is most preferable. It is incorporated at 10 to 99 parts by mass, preferably 30 to 90 parts.

The concrete examples of the suitable alkyl acrylate esters having an alkyl group of 1 to 8 carbon atoms for the polymer (D) containing hydroxyl group include lower alkyl acrylate esters, e.g., methyl acrylate, ethyl acrylate, butyl acrylate and 2-ethylhexyl acrylate. The alkyl acrylate ester is incorporated at 0 to 79 parts by mass, preferably 0.5 to 40 parts, more preferably 5 to 25 parts.

The polymer (D) containing hydroxyl group preferably has a glass transition temperature of 80° C. or higher, more preferably 90° C. or higher, viewed from its resistance to chemicals. It is necessary to incorporate the alkyl acrylate ester at above 0 parts by mass but 5 parts by mass or less, preferably above 0 parts by mass but 2 parts by mass or less.

The polymer (E) containing hydroxyl group is produced by polymerization of a monomer composition of 5 to 80 parts of a hydroxyalkyl acrylate ester or hydroxyalkyl methaacrylate ester having an alkyl group of 1 to 8 carbon atoms, 10 to 94 parts of an alkyl methacrylate ester having an alkyl group of 1 to 13 carbon atoms, and 1 to 80 parts of an aromatic vinyl monomer, all parts by mass, where these components account for 100 parts.

The hydroxyalkyl (meth)acrylate esters having an alkyl group of 1 to 8 carbon atoms for the polymer (E) containing hydroxyl group may be the same as those for the polymer (D) containing hydroxyl group. The hydroxyalkyl acrylate ester is incorporated at 5 to 80 parts by mass. It can sufficiently exhibit the matting affect, when present at 5 part by mass or more, and keep the particles well dispersed and impart good film-making properties when present at 80 parts by mass or less. It is incorporated preferably at 5 to 50 parts by mass, more preferably 10 to 20 parts, viewed from the matting and film-making properties and resistance to chemicals.

The alkyl methacrylate esters having an alkyl group of 1 to 13 carbon atoms for the polymer (E) containing hydroxyl group may be the same as those for the polymer (D) containing hydroxyl group. The alkyl methacrylate ester is incorporated at 10 to 94 parts by mass, more preferably 50 to 90 parts.

The aromatic vinyl monomer for the polymer (E) containing hydroxyl group may be selected from known ones, e.g., styrene and α-methyl styrene, of which styrene is more preferable. Use of the aromatic vinyl monomer can improve resistance of the film to chemicals. It is incorporated at 1 to 80 parts, preferably 5 to 40 parts, more preferably 5 to 20 parts, all parts by mass.

The polymer (E) containing hydroxyl group preferably has a glass transition temperature of 80° C. or higher, more preferably 90° C. or higher, viewed from its resistance to chemicals.

The polymer (D) or (E) containing hydroxyl group preferably has an intrinsic viscosity adjusted in a range of 0.05 to 0.3 L/g, more preferably 0.06 to 0.15 L/g, viewed from manifestation of the matting effect and outer appearances. Moreover, it is preferably incorporated with a polymerization adjustor, e.g., mercaptan, to adjust its molecular weight. The mercaptans useful for the present invention include n-octyl mercaptane, n-dodecyl mercaptane and t-dodecyl mercaptane. However, it is not limited to the above compounds, and may be selected from various known ones.

The method of producing the polymer (D) or (E) containing hydroxyl group is not limited, but it is preferably produced by suspension polymerization, emulsion polymerization or the like. The initiator for the suspension polymerization may be selected from various known ones, e.g., organic peroxide and azo compound. The suspension stabilizer may be selected from various known ones, e.g., organic and inorganic colloidal polymers, fine inorganic particles, and a combination thereof and surfactant. The suspension polymerization is normally effected in the aqueous suspension in the presence of a suspension stabilizer and monomer as the polymerization initiator. Another choice is a polymer soluble in the monomer; it may be used for the suspension polymerization, after being dissolved in the monomer.

The matting agent is incorporated at 0.1 to 40 parts by mass per 100 parts by mass of the acrylic resin composition (A) or (B). It can sufficiently exhibit the matting effect when present at 0.1 parts by mass or more, preferably 2 parts by mass or more for the better effect.

In particular, use of the polymer (D) or (E) containing hydroxyl group as the matting agent little deteriorate the film properties, e.g., elongation. Therefore, it allows the film to be used in good conditions, without causing problems, e.g., breakage in the in-mold forming step or the like, required for the subsequent vacuum molding or the like.

In the present invention, it is preferable to incorporate 0.1 to 20 parts by mass of the thermoplastic polymer (F), described below, per 100 parts by mass of the acrylic resin composition (A) or (B).

The thermoplastic resin (F) is produced by polymerization of 50 to 100 parts by mass of methyl methacrylate and 0 to 50 parts by mass of another vinyl monomer copolymerizable therewith, where these components account for 100 parts, and has a reduced viscosity (measured at 25° C. for 0.1 g of the polymer dissolved in 100 mL of chloroform) of more than 0.2 L/g. Use of the thermoplastic resin (F) improves film-making properties, and hence is effective in particular when high-level thickness accuracy and film-making speed are required. It gives the film of good thickness accuracy, because it has a reduced viscosity above 0.2 L/g. Its reduced viscosity is normally above 0.2 L/g but 2 L/g or less, preferably 1.2 L/g or less.

The other vinyl monomers copolymerizable with methyl methacrylate for the thermoplastic polymer (F) include alkyl methacrylate ester other than alkyl acrylate ester and methyl methacrylate, aromatic vinyl compound and vinyl cyanide.

The method of polymerization for producing the thermoplastic polymer (F) is preferably based on emulsion polymerization. In the production of the thermoplastic polymer (F), the polymer latex, e.g., that produced by emulsion polymerization, is separated and recovered with the aid of a coagulant selected from various ones, or the solids are separated and recovered by spray drying, to produce the polymer powder.

The thermoplastic polymer (F), used for the present invention as required, is incorporated preferably at 0.1 to 20 parts by mass per 100 parts by mass of the acrylic resin composition (A) or (B). It exhibits the effect of improving film-making properties when present at 0.1 parts or more by mass, and keeps the resin composition at an adequate viscosity to realize the good film-making properties when present at 20 parts or less.

The acrylic resin film of the present invention may be incorporated with one or more common additives, e.g., stabilizer, lubricant, processing aid, plasticizer, aid for improving impact resistance, foaming agent, filler, colorant and ultraviolet absorber.

It is preferable to incorporate a ultraviolet absorber to improve resistance of the film to weather, viewed from protection of the base material. It preferably has a molecular weight of 300 or more, more preferably 400 or more. Its evaporation in the injection or pressure forming mold is controlled, when its molecular weight is 300 or more, to prevent contamination of the mold. The ultraviolet ray absorber type is not limited, but the particularly preferable ones are benzotriazole-based and triazine-based ones having a molecular weight of 400 or more. The commercial products include Ciba-Geigy's Tinuvin 234 and Asahi Denka Kogyo's Adekastab LA-31 for the former, and Ciba-Geigy's Tinuvin 1577 for the latter.

The polymer (D) or (E) containing hydroxyl group, when used, is preferably incorporated with 0.01 to 3 parts by mass of a phosphorus-based compound, viewed from matting. It gives a good matting effect when present at 0.01 parts by mass or more. It is preferable to use it at 3 parts by mass or less for economic reasons, more preferably 0.1 to 1 part by mass.

The concrete examples of the phosphorus-based compounds useful for the present invention include phosphite-based ones, e.g., alkyl phosphite, alkyl aryl phosphite, aryl phosphite and alkyl nonylphenyl phosphite; phosphate-based compounds, e.g., trialkyl phosphate, tripolyoxyethylene alkyl phosphate, dialkyl phosphate and metallic salts thereof, dipolyoxyethylene alkyl phosphate and metallic salts thereof, alkyl phosphate and metallic salts thereof and polyoxyethylene alkyl ether phosphate and metallic salts thereof; and phosphonate-based compounds, e.g., dialkylalkyl phosphonate, alkylalkyl phosphonate and metallic salts thereof, of which phosphite-based ones are more preferable for manifestation of matting properties. Furthermore, phosphite-based compounds having no bulky substituent around the phosphate group are still more preferable for manifestation of matting properties.

The present invention can be produced by forming the various acrylic resins described earlier into a film of desired shape. The acrylic resin preferably contains chloroform-insoluble gel at 5 to 75% by mass. At a gel content of 5% by mass or more, the acrylic resin will contain the rubber-containing polymer at essentially 5% by mass ore more, and should have good film-making properties, because the film is prevented from becoming fragile. At a gel content of 75% by mass or less, on the other hand, the acrylic resin can be kept at an adequate melt tension during the film-making process, and should have good film-making properties. The gel content is more preferably in a range of 10 to 60% by mass.

The acrylic resin preferably has a thermal deformation temperature of 60 to 115° C. The film has a melt viscosity increasing to an adequate level during the film-making process when it has a thermal deformation temperature of 60° C. or higher, and is released well from the mirror-ground roll, preventing it from being entangled with the film. When it has a thermal deformation temperature of 115° C. or lower, the film smoothly follows the rubber or embossed roll, has the well-manifested matting effect on the film surface which has come into contact with the rubber or embossed roll, similarly allows the mirror-ground roll to have improved mirror surface transferability to the acrylic resin film, increases in flatness on the surface which has come into contact with the mirror-ground roll, and has reduced missing prints. The thermal deformation temperature is more preferably 70 to 105° C., still more preferably 80 to 95° C.

The acrylic resin film of the present invention may be produced by various known methods. The particularly preferable method comprises melt extrusion of the acrylic resin composition by T-die or the like, and rolling the extrudate between a mirror-ground roll and rubber or embossed roll into the film. The rolling with the mirror-ground and rubber rolls is more preferable than that with the mirror-ground and embossed rolls, because it can produce the relatively thin film, 50 μm thick or so. The calendering method maybe used, when it is modified in such a way that one of the mirror-ground rolls between which the film is placed in the final stage is changed to a rubber or embossed roll. In an other method useful for the present invention, the acrylic resin composition is heated to its glass transition temperature or higher, after being formed into a film by a known method, and rolled between a mirror-ground roll and rubber or embossed roll.

The mirror-ground roll for the present invention may be selected from various known ones. The particularly preferable one is plated with chromium to have a surface roughness of 0.5S or less.

Keeping the mirror-ground roll at high temperature during the film-making process brings about various advantages. For example, the film smoothly follows the rubber or embossed roll, has the well-manifested matting effect on the film surface which has come into contact with the rubber or embossed roll, similarly allows the mirror-ground roll to have improved mirror surface transferability to the acrylic resin film, increases in flatness on the surface which has come into contact with the mirror-ground roll, and has reduced missing prints. When the mirror-ground roll is kept at an excessively high temperature, it may not allow the acrylic resin film to be smoothly released, or may be even entangled with the film. On the other hand, when the mirror-ground roll is kept at an excessively low temperature, it may have insufficient mirror surface transferability to the acrylic resin film or insufficient effect of reducing missing prints, or tend to crease the film. It is necessary to control temperature of the mirror-ground roll in a range of 20 to 140° C., although varying depending on glass transition temperature of the acrylic resin, preferably in a range of 50 to 120° C., still more preferably 60 to 100° C.

The rubber roll for the present invention maybe selected from various known ones. It is preferably of silicone, particularly viewed from resistance to heat, more preferably silicone containing sand to realize the good matting effect. The acrylic resin film is required to have desired matted outer appearances depending on its purposes. Accordingly, particle size and quantity of the sand required vary depending on its purposes. More specifically, for example, the rubber roll of silicone incorporated with 50% by mass of sand having an average particle size of 40 μm may be used. The rubber roll may be replaced by the embossed roll. The embossed roll may be selected from various known ones.

It is preferable, when the acrylic resin is to be melt-extruded, that the molten resin is extruded while being filtered through a screen mesh of 200 meshes or more.

The differential 60° gloss of the acrylic resin film thus produced can be controlled by the film-making conditions, and type of the roll not mirror-ground, e.g., rubber or embossed roll, where the differential 60° gloss is defined as 60° gloss of the film surface which has come into contact with the mirror-ground roll minus that of the film surface which has not come into contact with the mirror-ground roll. It is necessary to secure the differential surface gloss of 5% or more, viewed from preventing missing prints and securing the required matting effect. It is preferably 10% or more, more preferably 15% or more.

The mirror surface is transferred to the film side which has come into contact with the mirror-ground roll. Therefore, the projections, which are caused by foreign matter and cause missing prints, are greatly reduced on that side of the film. The 60° gloss of the film side which has which has not come into contact with the mirror-ground roll can be controlled by type of the roll not mirror-ground, e.g., rubber or embossed roll. The surface gloss is preferably 50% or less, viewed from the decorated and matted outer appearances of the film, more preferably 20% or less, still more preferably 10% or less.

The acrylic resin film preferably has a 60° gloss of 50% or less on one side, when heated at 120° C. for 48 hours. It is more preferably 20% or less on the heated surface, still more preferably 10% or less. The acrylic resin film having the above surface gloss is preferably incorporated with the polymer (D) or (E) containing hydroxyl group. Such a film, when processed by insert or in-mold forming, will not change in surface gloss.

A surface gloss of the acrylic resin film doesn't tend to change during the insert or in-mold forming process as thermal deformation temperature of present invention having a similar surface gloss increases.

It preferably has a thermal deformation temperature of 85 to 105° C., viewed from not changing a surface gloss of the acrylic resin film during the forming process, in addition to releasability from the mirror-ground roll and ability of following movement of the rubber or embossed roll, described earlier, more preferably 90 to 100° C.

The acrylic resin film of the present invention is particularly useful, when provided with a picture or pattern by an adequate printing method. For example, the printed acrylic resin film can easily give a decorated laminate (formed laminate article), when it is put on the desired base (formed article or the like) in place of the film as a substitute for coating material.

When the acrylic resin film is to be printed, it is preferably printed on one side, particularly on the side having a higher 60° surface gloss, viewed from reducing missing prints. When the laminate is produced, it is put on the base in such a way that the printed side comes into contact with the base, viewed from protection of the printed surface and giving high-quality feeling. It can be printed by various common methods, e.g., gravure, flexography and silk screening. It can be colored, as required.

Number of missing prints per unit area on the printed surface is preferably $10/m^2$ or less, viewed from its design and decorative value. The film gives good outer appearances to the formed laminate article, when its missing print number is $10/m^2$ or less. The number is more preferably $5/m^2$ or less, still more preferably $1/m^2$ or less.

The conventional matted film tends to have more than $10/m^2$ missing prints, when printed. Such a film, when provided with a wood grain pattern, for example, may not suffer much deteriorated outer appearances, because missing prints may look like worm-eaten dots. When printed with a metallic pattern, on the other hand, the missing prints deteriorate decorations and outer appearances, because they clearly tell the defects. Therefore, the missing prints make the product defective, and decrease production yield. The acrylic resin film of the present invention, on the other hand, can decrease missing prints, and hence has a very high industrial utilization value.

The acrylic resin film has a thickness of 300 $\mu$m or less. It is preferably 50 to 300 $\mu$m thick, when used in place of a coating material. It provides the formed article appearances with sufficient deepness, when 50 $\mu$m thick or more. It can have a sufficient thickness by drawing, when it is formed into a complex shape. It has an adequate toughness when it is 300 $\mu$m thick or less, to have the improved properties related to lamination and secondary processing. It is economically advantageous viewed from mass per unit area, and formed into the film more easily, because of its improved film-making stability.

A formed article should be coated more than 10 times in the ordinary coating procedure to have the coating film of sufficient thickness, which pushes up the cost and greatly deteriorates productivity. On the other hand, use of the acrylic resin film of the present invention, itself serving as the coating film, can easily give the very thick coating film, and hence is industrially highly advantages.

When used to produce the laminate, the acrylic resin film is preferably put on the base in such a way that the film side having a higher 60° surface gloss (i.e., the side which is printed, as required) is bought into contact with the base, viewed from protection of the printed surface and giving high-quality feeling.

One of the examples of the laminate bases is a formed article of resin. The resin that constitutes the formed article is not limited, so long as it is adhesive to the acrylic resin film, when molten. These resins include ABS, AS, polystyrene, polycarbonate, vinyl chloride, acrylic and polyester-based resins, including those containing them as the major components, of which ABS, AS, polycarbonate and vinyl chloride resins, including those containing them as the major components, are more preferable for their adhesiveness. In particular, ABS and polycarbonate resins, including those containing them as the major components, are still more preferable. Even when the resin for the substrate is not thermally fusible, e.g., polyolefin, the laminate of the acrylic resin on the base can be produced by putting an adhesive layer in-between.

When the laminate of the acrylic resin film of the present invention on a base of two-dimensional shape is to be produced, a known method, e.g., thermal lamination, may be used for the thermally fusible base. The laminate can be produced, even when the base is not thermally fusible, by putting an adhesive agent in-between. The laminate with a base of three-dimensional shape can be produced also by a known method, e.g., insert or in-mold forming, the latter being more preferable for its higher productivity.

In the in-mold forming method, the acrylic resin film is heated and then vacuum-molded in a mold which can be kept under a vacuum. This method is preferable for operability and economic efficiency, because film shaping and injection molding are effected in one stage. The acrylic resin film is heated preferably at its softening temperature or higher, generally at 70° C. or higher, although the required temperature level varies depending on thermal properties of the film and shape of the formed article. When the acrylic resin film is exposed to an excessively high temperature, a surface gloss of the acrylic resin film changes. The temperature level at which a surface gloss of the acrylic resin film changes also depends on thermal properties of the film and shape of the formed article, but the preferable heating temperature is generally 170° C. or lower.

When a film is formed into a three-dimensional shape by vacuum molding, it is important that the portion formed at the mold corners are not whitened and well follow the corners. In this respect, vacuum molding is the method which can fully utilize the characteristics of the acrylic resin film. More specifically, the acrylic resin film is highly elongating at high temperature, which makes itself very advantageous in vacuum molding.

The mold with which the acrylic resin film comes into contact during the vacuum molding process is preferably embossed, because the surface gloss of the acrylic resin film produced by using the embossed mold is not easy to change during the in-mold forming process.

The molded laminate article coated with the acrylic resin film can be produced by the in-mold forming method, in which the three-dimensional shape is formed by the vacuum molding, and then the acrylic resin film and resin for the base are fused by injection molding to form the monolithic structure.

The purposes of the molded laminate coated with the acrylic resin film are not limited. It can go into various areas, e.g., vehicle internals (e.g., console box and shit lever box), vehicle externals (e.g., two-wheeled vehicle cowling), home electronic/electric appliances, furniture, and construction materials, which have been with provided with matted coating.

The acrylic resin film of present invention, produced by using the polymer (D) or the polymer (E) having a grass transition temperature of 80° C. or higher is extremely excellent resistance to chemicals and useful for a surface layer of a laminate of vehicle internals.

EXAMPLES

The present invention is described in more detail by Examples, which by no means limit the present invention, where "part(s)" means part(s) by mass. The compounds used in Examples are abbreviated by the following symbols.

| | |
|---|---|
| Methyl methacrylate | MMA |
| Methyl acrylate | MA |
| Butyl acrylate | BA |
| Styrene | St |
| α-Methyl styrene | αM-ST |
| Cyclohexyl maleimide | CHMI |
| Hydroxyethyl methacrylate | HEMA |
| Allyl methacrylate | AMA |
| 1,3-butylene glycol methacrylate | 1,3BD |
| t-butyl hydroperoxide | tBH |
| t-hexyl hydroperoxide | tHH |
| Lauryl peroxide | LPO |
| n-Octyl mercaptan | nOM |

The properties were determined in Examples by the following methods.

1) Reduced Viscosity and Intrinsic Viscosity

Reduced viscosity of the thermoplastic polymers (A-2) and (F), and intrinsic viscosity of the polymers (D) and (E) were determined at 25° C. by an automatic viscometer (Sun Denshi Kogyo, AVL-2C) with chloroform as the solvent. For measurement of intrinsic viscosity, 0.1 g of the sample was dissolved in 100 mL of chloroform.

2) Particle Size

Particle size of the rubber-containing polymer (A-1) and polymer of multi-layered structure [acrylic resin composition (B)] was measured by the dynamic light scattering method using a light scattering photometer (Otuka Electronics, DLS-700) for the final particle size of each polymer, produced by the emulsion polymerization.

3) 60° Surface Gloss

The 60° surface gloss was measured using a gloss meter (Murakami Color Research Laboratory, GM-26D).

4) Thermal Deformation Temperature of the Acrylic Resin Composition

The test piece was prepared in accordance with ASTM D648 by injection molding of the palletized acrylic resin before it was formed into the film, and annealed at 80° C. for 24 hours. It was tested also in accordance with ASTM D648 at a low load (0.45 MPa) to determine its thermal deformation temperature.

5) Gel Content of the Acrylic Resin Composition

The palletized acrylic resin was dissolved in chloroform, before it was formed into the film, to prepare the 1% by mass solution, left at 25° C. for 24 hours, and treated by centrifugal separation at 16,000 rpm for 90 minutes. It was dried, after the supernatant liquid was removed, to determine the insolubles content (% by mass) as the gel content.

6) Number of Missing Prints

The acrylic resin film was gravure-printed with a pattern on the side which has come into contact with the mirror-ground roll, and visually observed for an area of 5 $m^2$ to count number of missing prints, which was reduced to the number per unit area (1 $m^2$).

7) Resistance to Chemicals

A polyethylene cylinder, 38 mm in inner diameter and 15 mm high, was pressed fast to the surface of the formed laminate sample by a presser, and 5 mL of an aromatic for automobiles (Dia Chemical, Gracemate Poppy, Orange) was injected into the cylinder from its opening. It was left in a constant-temperature bath kept at 55° C. for 4 hours, while the opening was covered with a glass plate. On completion of the test, the sample was washed with water and dried by air, after the presser was removed, to observe the whitened conditions on the sample surface. The resistance to the chemical was evaluated according to the following standards:

×—Whitened strongly

<—Whitened weakly

;—Whitened only slightly

T—No whitening observed

8) Glass Transition Temperature of the Polymers (D) and (E) Containing Hydroxyl Group The glass transition temperature was determined by the FOX equation.

9) 60° Surface Gloss of Laminate (Surface Gloss 2)

The acrylic resin film was pasted, with the side which had come into contact with the mirror-ground roll inside, on a polycarbonate plate by an epoxy-based adhesive. The resultant laminate was left in the atmosphere kept at 120° C. for 48 hours, to measure its 60° surface gloss.

Production Example 1

Production of Acrylic Resin Composition (A)

244 parts of deionized water was put in a reactor vessel equipped with a reflux condenser, and heated to 80° C. in a nitrogen atmosphere. Then, 1/15 of the starting mixture (a) [part of the starting mixture for the polymer (a-1)] described below was charged, with stirring, and held for 15 minutes. The remainder of the starting mixture (b) was then added continuously at 8%/hour as the increase rate of the monomer mixture relative to water. They were held for 1 hour for the polymerization, to produce the polymer latex. Then, the latex was incorporated with 0.6 parts of sodium formaldehyde sulfoxylate, and the mixture was held for 15 minutes, to which the starting mixture (c) [part of the starting mixture for the polymer (a-1)] described below was continuously added at 4%/hour as the increase rate of the monomer mixture relative to water, with stirring in a nitrogen atmosphere at 80° C. They were held for 2 hours for the polymerization, to produce the latex of the elastic copolymer (a-1).

Then, the latex of the elastic copolymer (a-1) was incorporated with 0.4 parts of sodium formaldehyde sulfoxylate, and the mixture was held for 15 minutes, to which the starting mixture (d) [part of the starting mixture for the polymer (a-2)] described below was continuously added at 10%/hour as the increase rate of the monomer mixture relative to water, with stirring in a nitrogen atmosphere at 80° C. They were held for 1 hour for the polymerization, to produce the latex of the rubber-containing polymer (A-1). The rubber-containing polymer (A-1) had a particle size of 0.28 μm.

The latex of the rubber-containing polymer (A-1) was filtered by a filter having a mesh of 50 μm, subjected to the coagulation, flocculation and solidification reactions with calcium acetate, and then filtered, washed with water and dried, to produce the rubber-containing polymer (A-1).

| (a) | | |
|---|---|---|
| Sodium formaldehyde sulfoxylate | 0.6 | parts |
| Ferrous sulfate | 0.00012 | parts |
| Disodium ethylenediaminetetraacetate | 0.0003 | parts |
| (b) | | |
| MMA | 18.0 | parts |
| BA | 20.0 | parts |
| St | 2.0 | parts |
| AMA | 0.4 | parts |
| 1,3BD | 0.14 | parts |
| tbh | 0.18 | parts |
| Partially neutralized mixture of 40% of mono (polyoxyethylenenonylphenyl ether) phosphoric acid and 60% of di (polyoxyethylenenonylphenyl ether) phosphoric acid with sodium hydroxide | 1.0 | part |
| (c) | | |
| BA | 50.0 | parts |
| St | 10.0 | parts |
| AMA | 0.4 | parts |
| 1,3BD | 0.14 | parts |
| tHH | 0.2 | parts |
| Partially neutralized mixture of 40% of mono (polyoxyethylenenonylphenyl ether) phosphoric acid and 60% of di (polyoxyethylenenonylphenyl ether) phosphoric acid with sodium hydroxide | 1.0 | part |
| (d) | | |
| MMA | 57.0 | parts |
| MA | 3.0 | parts |
| nOH | 0.3 | parts |
| tBH | 0.06 | parts |

23 parts of the rubber-containing polymer (A-1) was mixed with 77 parts of the MMA/MA copolymer (MMA/MA: 99/1, reduced viscosity: 0.06 L/g) as the thermoplastic polymer (A-2), to produce the acrylic resin composition (A).

Production Example 2

Production of Acrylic Resin Composition (B)

250 parts of ion-exchanged water, 2 parts of sodium salt of sulfosuccinate ester and 0. 05 parts of sodium formaldehyde sulfoxylate were charged in a polymerization reactor vessel, and stirred in a nitrogen atmosphere, to which a mixture of 1.6 parts of MMA, 8 parts of BA, 0.4 parts of 1,3BD, 0.1 parts of AMA and 0.04 parts of cumene hydroperoxide was added. They were heated to 70° C., at which the reactions were allowed to proceed continuously for 60 minutes, to complete the polymerization for producing the polymer (B-a) for the innermost layer. Then, a mixture of 1.5 parts of MMA, 2.25 parts of BA, 1.0 part of 1,3BD, 0.25 parts of AMA and 0.05 parts of cumene hydroperoxide for production of the crosslinked polymer (B-a) was charged in 60 minutes. They were polymerized, to produce the 2-layered crosslinked rubber elastomer, composed of the polymer (B-a) for the innermost layer and crosslinked elastic polymer (B-a).

Then, 5 parts of MMA, 5 parts of BA and 0.1 parts of AMA were reacted with each other in the presence of the 2-layered crosslinked rubber elastomer to form the polymer (B-d) for the intermediate layer, and finally a mixture of 52.25 parts of MMA and 2.75 parts of BA was reacted to form the polymer (B-c) for the outer most layer. This resulted in the polymer latex of multi-layered structure.

The polymer of multi-layered structure had a particle size of 0.12 μm. The resultant polymer latex was filtered by a filter having a mesh of 75 μm, subjected to the salting-out with 5 parts of calcium acetate for 100 parts of the polymer, washed with water and dried, to produce the acrylic resin composition (B).

Production Example 3

Production of Acrylic Resin Composition (C)

A mixture of the following composition was charged in a reaction vessel equipped with an agitator, reflux condenser and nitrogen-introducing nozzle, among others:

| MA | 10 parts |
|---|---|
| MMA | 60 parts |
| HEMA | 30 parts |
| n-OM | 0.15 parts |
| LPO | 0.5 parts |
| Copolymer of methyl methacrylate/methacrylate/methacrylate ester ethyl sulfonate | 0.05 parts |
| Sodium sulfate | 0.5 parts |
| Ion-exchanged water | 250 parts |

The reactor vessel was sufficiently purged with nitrogen, and the content was heated to 75° C. with stirring, to allow the polymerization to proceed for 2 hours in a flow of nitrogen gas. It was further heated to 90° C., at which it was held for 45 minutes to complete the polymerization. The resultant polymer beads were dehydrated and dried, to produce the polymer (D)-1 having hydroxyl group. It had an intrinsic viscosity of 0.069 L/g and glass transition temperature of 77° C. 10 parts of the polymer (D)-1 having hydroxyl group was incorporated as the matting agent in 100 parts of the acrylic resin composition (A) prepared in Production Example 1 or 100 parts of the acrylic resin composition (B) prepared in Production Example 2, to produce the two types of the acrylic resin composition (C).

Production Example 4

Production of Polymer (D)-2 Having Hydroxyl Group

A mixture of the following composition was charged in a reaction vessel equipped with an agitator, reflux condenser and nitrogen-introducing nozzle, among others:

| MA | 1 part |
|---|---|
| MMA | 79 parts |
| HEMA | 20 parts |
| n-OM | 0.14 parts |
| LPO | 0.5 parts |
| Copolymer of methyl methacrylate/methacrylate/methacrylate ester ethyl sulfonate | 0.05 parts |
| Sodium sulfate | 0.5 parts |
| Ion-exchanged water | 250 parts |

The reactor vessel was sufficiently purged with nitrogen, and the content was heated to 75° C. with stirring, to allow the polymerization to proceed for 2 hours in a flow of nitrogen gas. It was further heated to 90° C., at which it was held for 45 minutes to complete the polymerization. The resultant polymer beads were dehydrated and dried, to produce the polymer (D)-2 having hydroxyl group. It had an intrinsic viscosity of 0.076 L/g and glass transition temperature of 93° C.

Production Example 5

Production of Polymer (D)-3 Having Hydroxyl Group

A mixture of the following composition was charged in a reaction vessel equipped with an agitator, reflux condenser and nitrogen-introducing nozzle, among others:

| MA | 1 part |
|---|---|
| MMA | 89 parts |
| HEMA | 10 parts |
| n-OM | 0.11 parts |
| LPO | 0.5 parts |
| Copolymer of methyl methacrylate/methacrylate/methacrylate ester ethyl sulfonate | 0.05 parts |
| Sodium sulfate | 0.5 parts |
| Ion-exchanged water | 250 parts |

The reactor vessel was sufficiently purged with nitrogen, and the content was heated to 75° C. with stirring, to allow the polymerization to proceed for 2 hours in a flow of nitrogen gas. It was further heated to 90° C., at which it was held for 45 minutes to complete the polymerization. The resultant polymer beads were dehydrated and dried, to produce the polymer (D)-3 having hydroxyl group. It had an intrinsic viscosity of 0.09 L/g and glass transition temperature of 98° C.

Production Example 6

Production of Polymer (E) Having Hydroxyl Group

A mixture of the following composition was charged in a reaction vessel equipped with an agitator, reflux condenser and nitrogen-introducing nozzle, among others:

| ST | 20 parts |
|---|---|
| MMA | 60 parts |
| HEMA | 20 parts |
| n-OM | 0.1 parts |
| LPO | 0.5 parts |
| Copolymer of methyl methacrylate/methacrylate/methacrylate ester ethyl sulfonate | 0.05 parts |
| Sodium sulfate | 0.5 parts |
| Ion-exchanged water | 250 parts |

The reactor vessel was sufficiently purged with nitrogen, and the content was heated to 75° C. with stirring, to allow the polymerization to proceed for 2 hours in a flow of nitrogen gas. It was further heated to 90° C., at which it was held for 45 minutes to complete the polymerization. The resultant polymer beads were dehydrated and dried, to produce the polymer (E) having hydroxyl group. It had an intrinsic viscosity of 0.11 L/g and glass transition temperature of 93° C.

Production Example 7

Production of Polymer (D)-4 Having Hydroxyl Group

A mixture of the following composition was charged in a reaction vessel equipped with an agitator, reflux condenser and nitrogen-introducing nozzle, among others:

| MA | 20 parts |
|---|---|
| MMA | 60 parts |
| HEMA | 20 parts |
| n-OM | 0.08 parts |
| LPO | 0.5 parts |
| Copolymer of methyl methacrylate/methacrylate/methacrylate ester ethyl sulfonate | 0.05 parts |
| Sodium sulfate | 0.5 parts |
| Ion-exchanged water | 250 parts |

The reactor vessel was sufficiently purged with nitrogen, and the content was heated to 75° C. with stirring, to allow the polymerization to proceed for 2 hours in a flow of nitrogen gas. It was further heated to 90° C., at which it was held for 45 minutes to complete the polymerization. The resultant polymer beads were dehydrated and dried, to produce the polymer (D)-4 having hydroxyl group. It had an intrinsic viscosity of 0.11 L/g and glass transition temperature of 71° C.

Production Example 8

Production of Polymer (D)-5 Having Hydroxyl Group

A mixture of the following composition was charged in a reaction vessel equipped with an agitator, reflux condenser and nitrogen-introducing nozzle, among others:

| MA | 1 part |
|---|---|
| MMA | 69 parts |
| HEMA | 30 parts |
| n-OM | 0.15 parts |
| LPO | 0.5 parts |
| Copolymer of methyl methacrylate/methacrylate/methacrylate ester ethyl sulfonate | 0.05 parts |
| Sodium sulfate | 0.5 parts |
| Ion-exchanged water | 250 parts |

The reactor vessel was sufficiently purged with nitrogen, and the content was heated to 75° C. with stirring, to allow the polymerization to proceed for 2 hours in a flow of nitrogen gas. It was further heated to 90° C., at which it was held for 45 minutes to complete the polymerization. The resultant polymer beads were dehydrated and dried, to produce the polymer (D)-5 having hydroxyl group. It had an intrinsic viscosity of 0.072 L/g and glass transition temperature of 87° C.

Production Example 9

Production of Polymer (F) Having Hydroxyl Group

A reactor vessel was charged with 200 parts of nitrogen-purged ion-exchanged water, 1 part of potassium oleate as the emulsifier and 0.3 parts of potassium persulfate, and then with 40 parts of MMA, 10 parts of BA and 0.005 parts of n-OM. They were stirred at 65° C. for 3 hours in a nitrogen atmosphere, to complete the polymerization. Then, a monomer mixture of 48 parts of MMA and 2 parts of BA was added to the polymerization system dropwise in 2 hours, to complete the polymerization. The latex thus obtained was added to 0.25% sulfuric acid solution in water to precipitate the polymer with acid. Then, the polymer was dehydrated, washed with water and dried, to recover the polymer in the form of powder. The resultant copolymer had a reduced viscosity ηsp/c of 0.38 L/g.

Example 1

100 parts of the acrylic resin composition (A) prepared in Production Example 1, 1 part of thermoplastic polymer (F)

prepared in Production Example 9, 1 part of an ultraviolet violet ray absorber (Ciba-Geigy's Tinuvin 1577) and 0.6 parts of a phosphite-based antioxidant (Asahi Denka Kogyo's PEP8F) were mixed by a Henschel mixer. The mixture was then molten, kneaded and palletized by a biaxial extruder (L/D: 26) with a 40 mm-diameter screw under the conditions of cylinder temperature: 200 to 260° C. and die temperature: 250° C., to produce the pellets as the film composition.

The palletized composition was dried at 80° C. for 24 hours, and then molten and extruded by an extruder (L/D: 26) with a 300 mm T-die, 400-mesh screen mesh and 40 mm-diameter non-vent screw under the conditions of cylinder temperature: 200 to 240° C. and T-die temperature: 250° C. The resin extruded through the T-die was placed between a cooling, mirror-ground roll kept at 75° C. (plated with chromium to have a surface roughness of 0.2S) and roll of silicone rubber containing 50 parts of sand having an average particle size of 40 $\mu$m, to be formed into the 200 $\mu$m thick acrylic resin film.

The acrylic resin film thus produced was gravure-printed on the side which had come into contact with the mirror-ground roll. It was heated at 140° C. for 1 minute, and subjected to vacuum forming in a mold, which could be kept under a vacuum. An ABS resin (Mitsubishi Rayon, Diampet ABS Bulksum TM20) was injected onto the printed side of the above film placed in the same mold, to produce the formed laminate.

Example 2

The formed laminate was prepared in the same manner as in Example 1, except that 100 parts of the acrylic resin (A) was replaced by 100 parts of the acrylic resin composition (B) prepared in Production Example 2.

Example 3

The formed laminate was prepared in the same manner as in Example 1, except that 100 parts of the acrylic resin (A) was incorporated with 10 parts of the polymer (D)-1 having hydroxyl group, prepared in Production Example 3 (i.e., one of the acrylic resin compositions (C) prepared in Production Example 3).

Example 4

The formed laminate was prepared in the same manner as in Example 2, except that 100 parts of the acrylic resin (B) was incorporated with 10 parts of the polymer (D)-1 having hydroxyl group, prepared in Production Example 3 (i.e., the other acrylic resin composition (C) prepared in Production Example 3).

Example 5

The formed laminate was prepared in the same manner as in Example 4, except that the cooling, mirror-ground roll was kept at 50° C.

Example 6

The formed laminate was prepared in the same manner as in Example 3, except that 10 parts of the polymer (D)-1 having hydroxyl group as the matting agent was replaced by 10 parts of a PMMA crosslinked powder having an average particle size of around 2 $\mu$m (Soken Chemical & Engineering, MR-2G).

Example 7

The formed laminate was prepared in the same manner as in Example 4, except that 10 parts of the polymer (D)-1 having hydroxyl group as the matting agent was replaced by 10 parts of a PMMA crosslinked powder having an average particle size of around 2 $\mu$m (Soken Chemical & Engineering, MR-2G).

Example 8

The formed laminate was prepared in the same manner as in Example 3, except that the sand-containing silicone rubber roll was replaced by an embossed roll.

Example 9

The formed laminate was prepared in the same manner as in Example 3, except that acrylic resin composition (A) comprising 77 parts of the MMA/MA copolymer (MMA/MA: 99/1, reduced viscosity: 0.06L/g) as the thermoplastic polymer (A-2) was replaced by that comprising 77 parts of the MMA/BA copolymer (MMA/BA: 80/20, reduced viscosity: 0.08 L/g).

Example 10

The formed laminate was prepared in the same manner as in Example 3, except that acrylic resin composition (A) comprising 77 parts of the MMA/MA copolymer (MMA/MA: 99/1, reduced viscosity: 0.06L/g) as the thermoplastic polymer (A-2) was replaced by that comprising 77 parts of the MMA/$\alpha$M-ST/CHMI copolymer (MMA/$\alpha$M-ST/CHMI: 85/5/10, reduced viscosity: 0.06 L/g).

Example 11

The formed laminate was prepared in the same manner as in Example 3, except that 10 parts of the polymer (D)-1 having hydroxyl group as the matting agent prepared in Production Example 3 was replaced by 10 parts of the polymer (D)-2 having hydroxyl group prepared in Production Example 4.

Example 12

The formed laminate was prepared in the same manner as in Example 3, except that 10 parts of the polymer (D)-1 having hydroxyl group as the matting agent prepared in Production Example 3 was replaced by 10 parts of the polymer (D)-3 having hydroxyl group prepared in Production Example 5.

Example 13

The formed laminate was prepared in the same manner as in Example 3, except that 10 parts of the polymer (D)-1 having hydroxyl group as the matting agent prepared in Production Example 3 was replaced by 10 parts of the polymer (E) having hydroxyl group prepared in Production Example 6.

Example 14

The formed laminate was prepared in the same manner as in Example 3, except that 10 parts of the polymer (D)-1 having hydroxyl group as the matting agent prepared in Production Example 3 was replaced by 10 parts of the polymer (D)-4 having hydroxyl group prepared in Production Example 7.

Example 15

The formed laminate was prepared in the same manner as in Example 14, except that PEP8F was not used.

Example 16

The formed laminate was prepared in the same manner as in Example 4, except that PEP8F was not used.

Example 17

The formed laminate was prepared in the same manner as in Example 3, except that 10 parts of the polymer (D)-1 having hydroxyl group as the matting agent prepared in Production Example 3 was replaced by 10 parts of the polymer (D)-5 having hydroxyl group prepared in Production Example 8.

Comparative Examples 1 to 4

The film was prepared and printed, and laminate was prepared in each of Comparative Examples 1 to 4 in the same manner as in each of corresponding Examples 1 to 4, except that the sand-containing silicone rubber roll was not used and only the mirror-grounded rolls were used. The film prepared in each of Comparative Examples 1 to 4 had a differential 60° surface gloss below 5%.

Evaluation Results

The evaluation results obtained in Examples and Comparative Examples are given in Table 1 below.

As described above, the present invention provides an acrylic resin film having good matted appearances and also good printing characteristics, e.g., little suffering missing prints when printed; method of producing the acrylic resin film; and laminate coated with the acrylic resin film on the surface. The laminate can go into automobile interiors, when incorporated with a matting agent having a specific glass transition temperature.

What is claimed is:

1. An acrylic resin film having a differential 60° surface gloss of 5% or more between front and back sides and a thickness of 300 μm or less, wherein at least one film side has a 60° surface gloss of 50% or less and said film comprises an acrylic resin composition (A) having a thermal deformation temperature of 60 to 115° C. as a constituent component, the acrylic resin composition (A) being composed of 5.5 to 99.9% by weight of a rubber-containing polymer (A-1) having a particle size of 0.01 to 0.5 μm and 0.1 to 94.5% by weight of a thermoplastic polymer (A-2) produced with an alkyl methacrylate ester as a major component, where the components (A-1) and (A-2) total 100% by weight; and the rubber-containing polymer (A-1), having a multi-layered structure with two or more layers, being composed of the hard polymer (a-2) as an outer layer having a structure of one or more layers, produced by graft polymerization of monomers with an alkyl methacrylate ester as a major component, in the presence of elastic copolymer (a-1) as an inner layer having a structure of one or more layers, produced with an alkyl acrylate ester as a major component.

2. An acrylic resin film, which contains an acrylic resin composition (C) as a constituent component, composed of

TABLE 11

| | Pelletized acrylic resin | | Film evaluation results | | | | Laminate evaluation results | | |
|---|---|---|---|---|---|---|---|---|---|
| | Gel content (%) | Thermal deformation temperature (° C.) | Surface gloss on the mirror-ground roll side (%) | Surface gloss on the side counter to the mirror-ground roll (%) | Differential surface gloss (%) | Number of missing prints (numbers/m²) | Surface gloss1 (%) | Resistance to the chemical | Surface gloss2 (%) |
| Example 1 | 22 | 101 | 153 | 20 | 133 | 0.2 | 82 | T | 74 |
| Example 2 | 60 | 80 | 153 | 15 | 138 | 0.1 | 113 | T | 105 |
| Example 3 | 20 | 98 | 20 | 7 | 13 | 5 | 15 | x | 6 |
| Example 4 | 55 | 81 | 28 | 8 | 20 | 4 | 27 | x | 19 |
| Example 5 | 55 | 81 | 18 | 12 | 6 | 16 | 33 | x | 22 |
| Example 6 | 29 | 101 | 42 | 13 | 29 | 6 | 42 | T | 39 |
| Example 7 | 64 | 82 | 45 | 11 | 34 | 5 | 54 | T | 43 |
| Example 8 | 20 | 98 | 26 | 6 | 20 | 4 | 14 | x | 6 |
| Example 9 (*1) | 20 | 67 | 33 | 6 | 27 | 2 | 44 | x | 33 |
| Example 10 | 20 | 110 | 16 | 8 | 8 | 16 | 12 | < | 6 |
| Example 11 | 20 | 99 | 24 | 7 | 17 | 5 | 16 | ; | 7 |
| Example 12 | 20 | 100 | 46 | 7 | 39 | 2 | 23 | T | 13 |
| Example 13 | 20 | 100 | 31 | 7 | 24 | 3 | 19 | T | 9 |
| Example 14 | 20 | 97 | 26 | 7 | 19 | 4 | 18 | x | 7 |
| Example 15 | 20 | 97 | 53 | 7 | 46 | 2 | 35 | x | 28 |
| Example 16 | 55 | 81 | 43 | 9 | 34 | 2 | 46 | x | 35 |
| Example 17 | 20 | 99 | 22 | 7 | 15 | 4 | 16 | < | 7 |
| Comparative Example 1 | 22 | 101 | 152 | 150 | 2 | 0.4 | 151 | T | 151 |
| Comparative Example 2 | 60 | 80 | 148 | 146 | 2 | 0.2 | 153 | T | 152 |
| Comparative Example 3 | 20 | 98 | 10 | 8 | 2 | 32 | 16 | x | 6 |
| Comparative Example 4 | 55 | 81 | 16 | 14 | 2 | 65 | 33 | x | 20 |

(*1) The mirror-ground roll was sometimes entwined with the film during the film-making process 100 parts by weight of the acrylic resin composition (A) according to claim 1 and 0.1 to 40 parts by weight of a matting agent and having a thermal deformation temperature of 60 to 115° C.

3. The acrylic resin film according to claim 2, wherein said matting agent is a polymer (D) containing hydroxyl groups, the polymer (D) containing hydroxyl groups being produced by polymerizing a monomer composition of 1 to 80 parts of a hydroxyalkyl acrylate ester or hydroxyalkyl methacrylate ester having an alkyl group of 1 to 8 carbon atoms, 10 to 99 parts of an alkyl methacrylate ester having an alkyl group of 1 to 13 carbon atoms, and 0 to 79 parts of an alkyl acrylate ester having an alkyl group of 1 to 8 carbon atoms, all parts by weight, where these components account for 100 parts.

4. The acrylic resin film according to claim 3, wherein said polymer (D) containing hydroxyl groups has a glass transition temperature of 80° C. or higher.

5. The acrylic resin film according to claim 2, wherein said matting agent is a polymer (E) containing hydroxyl groups, the polymer (E) containing hydroxyl groups being produced by polymerizing a monomer composition of 5 to 80 parts of a hydroxyalkyl acrylate ester or hydroxyalkyl methacrylate ester having an alkyl group of 1 to 8 carbon atoms, 10 to 94 parts of an alkyl methacrylate ester having an alkyl group of 1 to 13 carbon atoms, and 1 to 80 parts of an aromatic vinyl monomer, all parts by weight, where these components account for 100 parts.

6. The acrylic resin film according to claim 5, wherein said polymer (E) containing hydroxyl groups has a glass transition temperature of 80° C. or higher.

7. The acrylic resin film according to claim 2, which has a 60° gloss of 50% or less on one side, when heated at 120° F. for 48 hours.

8. The acrylic resin film according to claim 1, which is printed with a pattern on a side having a higher 60° surface gloss.

9. The acrylic resin film according to claim 1, which has 10/m$^2$ or less of missing prints on a printed side.

10. A method of producing the acrylic resin film according to claim 1, which comprises:

extruding a molten acrylic resin composition, and then
rolling said composition between a mirror-ground roll and a rubber roll into a film.

11. A method of producing the acrylic resin film according to claim 1, which comprises:

extruding a molten acrylic resin composition, and then
rolling said composition between a mirror-ground roll and an embossed roll into a film.

12. A laminate of an acrylic resin film according to claim 1, with a film side having a higher 60° surface gloss in contact with a base.

13. A laminate for vehicle internals, which has the acrylic resin film according to claims 4 or 6 as a surface layer.

14. The acrylic resin film according to claim 1, wherein the alkyl acrylate ester for component (a-1), which constitutes 35 to 99.9% by weight of the component, is butyl acrylate or 2-ethylhexyl acrylate.

15. The acrylic resin film according to claim 1, wherein the hard polymer (a-2) is an alkyl methacrylate selected from the group consisting of methyl methacrylate, ethyl methacrylate, butyl methacrylate, 2-ethylhexyl methacrylate and cyclohexyl methacrylate.

16. The acrylic resin film according to claim 1, wherein the rubber-containing polymer (A-1) has a particle size of 0.08 to 0.3 µm.

17. The An acrylic resin film having a differential 60° surface gloss of 5% or more between front and back sides and a thickness of 300 µm or less and comprising an acrylic resin composition (B) having a thermal deformation temperature of 60 to 115° C. as a constituent component:

the acrylic resin composition (B) having a basic structure composed of a polymer (B-a) for an innermost layer, produced by polymerizing a monomer composition composed of 80 to 100 parts by weight of an alkyl acrylate ester having an alkyl group of 1 to 8 carbon atoms or an alkyl methacrylate ester having an alkyl group of 1 to 4 carbon atoms (B-a1), 0 to 20 parts of another vinyl monomer (B-a2) having a copolymerizable double bond, and 0 to 10 parts of a multifunctional monomer (B-a3), all parts by weight, where these components account for 100 parts, the monomer composition being further incorporated with 0.1 to 5 parts by weight of a graft crosslinking agent for the polymerization, a crosslinked elastic polymer (B-b), produced by polymerizing a monomer composition of 80 to 100 parts of an alkyl acrylate ester (B-b1) having an alkyl group of 1 to 8 carbon atoms, 0 to 20 parts of another vinyl monomer (B-b2) having a copolymerizable double bond, and 0 to 10 parts of a multifunctional monomer (B-b3), all parts by weight, where these components account for 100 parts, 100 parts by weight of the above monomer composition being incorporated with 0.1 to 5 parts by weight of a graft crosslinking agent for the polymerization, and a polymer (B-c) for an outermost layer, produced by polymerizing a monomer composition of 51 to 100 parts of an alkyl methacrylate ester (B-c1) of 1 to 4 carbon atoms and 0 to 49 parts of another vinyl monomer (B-c2) having a copolymerizable double bond, all parts by weight, and having a glass transition temperature of 60° C. or higher, the acrylic resin composition (B) further having at least one intermediate layer (B-d) between the layer of the crosslinked elastic polymer (B-b) and the outermost layer of the polymer (B-c), the intermediate layer (B-d) being produced by polymerizing a monomer composition composed of 10 to 90 parts of an alkyl acrylate ester (B-d1) having an alkyl group of 1 to 8 carbon atoms, 90 to 10 parts of an alkyl methacrylate ester (B-d2) having an alkyl group of 1 to 4 carbon atoms, 0 to 20 parts of a monomer (B-d3) having a copolymerizable double bond, and 0 to 10 parts of a multifunctional monomer (B-d4), all parts by weight, where these components account for 100 parts, 100 parts by weight of the monomer composition being further incorporated with 0.1 to 5 parts by weight of a graft crosslinking agent for the polymerization, wherein the alkyl acrylate ester content simply decreasing in a descending order of the crosslinked elastic polymer (B-b), polymer (B-d) for the intermediate layer and polymer (B-c) for the outermost layer.

18. An acrylic resin film, which contains an acrylic resin composition (C) as a constituent component, composed of 100 parts by weight of the acrylic resin composition (B) according to claim 17 and 0.1 to 40 parts by weight of a matting agent and having a thermal deformation temperature of 60 to 115° C.

* * * * *